(12) United States Patent
Neumerkel et al.

(10) Patent No.: US 6,188,350 B1
(45) Date of Patent: Feb. 13, 2001

(54) METHOD FOR THE PROBABILISTIC ESTIMATION OF NOISY MEASUREMENTS

(75) Inventors: Dietmar Neumerkel; Thomas Gründer, both of Berlin (DE)

(73) Assignee: ABB Daimler-Benz Transportation (Technology) GmbH (DE)

( * ) Notice: Under 35 U.S.C. 154(b), the term of this patent shall be extended for 0 days.

(21) Appl. No.: 09/387,460

(22) Filed: Sep. 1, 1999

(30) Foreign Application Priority Data

Sep. 2, 1998 (DE) ............................................... 198 40 872

(51) Int. Cl.$^7$ ...................................................... G01S 7/292
(52) U.S. Cl. ............................ 342/104; 342/89; 342/115; 342/159; 342/162
(58) Field of Search ............................... 342/104, 89, 98, 342/99, 108, 115, 159, 162, 168, 195

(56) References Cited

U.S. PATENT DOCUMENTS

| | | | |
|---|---|---|---|
| 3,611,369 | * 10/1971 | Maguire | 342/91 |
| 4,622,556 | * 11/1986 | Bryant et al. | 342/174 |
| 5,165,051 | * 11/1992 | Kumar | 324/76.47 |
| 5,539,412 | * 7/1996 | Mendelson | 342/192 |
| 5,546,084 | * 8/1996 | Hindman | 342/25 |
| 5,808,579 | * 9/1998 | Rademacher | 342/93 |
| 5,900,835 | * 5/1999 | Stein | 342/159 |
| 5,943,661 | * 8/1999 | Katz | 706/16 |
| 6,011,507 | * 1/2000 | Curran et al. | 342/70 |
| 6,031,881 | * 2/2000 | Weill et al. | 375/341 |
| 6,104,336 | * 8/2000 | Curran et al. | 342/70 |

FOREIGN PATENT DOCUMENTS

| | | |
|---|---|---|
| 2709184A1 | * 2/1995 | (FR) . |
| 566218 | * 11/1977 | (SU) . |
| 896766B | * 1/1982 | (SU) . |
| 902241B | * 1/1982 | (SU) . |

OTHER PUBLICATIONS

"A multipath data association tracker for over–the–horizon radar", Pulford, G.W.; Evans, R.J., Aerospace and Electronic Systems, IEEE Transactions on, vol.: 34 Issue: 4, Oct. 1998, pp: 1165–1183.*

"Determination of windspeed within a weather storm using airborne Doppler radar", Deshpande, M.D.; Staton, L., Southeastcon '91., IEEE Proceedings of, 1991, pp. 508–519 vol. 1.*

* cited by examiner

*Primary Examiner*—John B. Sotomayor
(74) *Attorney, Agent, or Firm*—Webb Ziesenheim Logsdon Orkin & Hanson, P.C.

(57) ABSTRACT

In a method for the probabilistic estimation of measurements, based on a measurement signal in which an interference signal is superimposed on the value to be measured, the measurement signal is sampled at specified chronological intervals. A defined measurement range associated with the value to be measured is divided into discrete values and a model is formed of a process on which the measurement signal is based with discrete states that correspond to the discrete values of the measurement range. In the model, a probability value of the occurrence of each state is assigned for each sampling time, and the value to be measured is determined on the basis of the probability value of at least one state in this model. In addition, for each state of the model at a sampling time, a probability for the state to remain in its current state is determined, as well as a probability for the state to change to another state by the next sampling time. On the basis of the value of the measurement signal sampled in a current sampling time, the probability value for the occurrence of the states in the preceding sampling time and the probability for each state to remain unchanged and to change to another state between the two sampling times, the probability values for the occurrence of the states of the model for the current sampling time are recalculated.

20 Claims, 6 Drawing Sheets

METHOD FOR THE PROBABILISTIC
ESTIMATION OF NOISY MEASUREMENTS

BACKGROUND OF THE INVENTION

1. Field of the Invention

This invention relates to a method for the probablistic estimation of noisy measurements.

2. Brief Description of the Prior Art

To remove superimposed noise from measurement signals, one method of the prior art uses filtering with a high-pass, low-pass, band-pass or band-stop filter. In digital signal processing, FIR (finite impulse response) or IIR (infinite impulse response) filters are used, although depending on the design of the system, there can be significant delays in the reception of the signal. This delay can only be reduced at the expense of the filtering action.

An additional method of the prior art to eliminate noise and interference from measurement signals is to use a model of the noisy system, so that the interference signal without a useful signal is generated and can be subtracted from the measurement signal, as a result of which only the useful signal is received. This method is generally very complex, time-consuming and expensive, because it requires an accurate model of the noisy system.

The object of the invention is therefore a method for the probabilistic estimation of noisy measurements on the basis of a measurement signal in which a noise or interference signal is superimposed on the value to be measured, whereby a defined measurement range is associated with the value to be measured and the measurement signal is sampled at specified chronological intervals, and in which a suppression of the interference signal can be accomplished in a relatively simple manner with a minor delay and with high efficiency.

The invention teaches that this object can be accomplished by the features disclosed in the characterizing portion of claim 1. Advantageous refinements of the method claimed by the invention are disclosed in the subclaims.

SUMMARY OF THE INVENTION

The invention teaches that the measurement range is divided into discrete values, a model of a process on which the measurement signal is based is formed with discrete states that correspond to the discrete values of the measurement range, in which at each sampling time, a probability value of the occurrence of each state is assigned to each state, whereby the value to be measured is determined on the basis of the probability value at least one state, that at each sampling point, a probability for the state to remain unchanged is assigned to each state, as well as a probability for the state in question to change to another state by the next sampling time, and that on the basis of the sampled value of the measurement signal at a current sampling time, the probability values for the occurrence of the states in the preceding sampling time and the probabilities for each state to remain unchanged and to change to another state between the two sampling times, the probability values for the occurrence of the states of the model at the current sampling time are recalculated, and the result is a good adaptability to the stochastic and deterministic characteristics of the process and of the sensor, as well as a good adaptability to any desired filter action.

BRIEF DESCRIPTION OF THE DRAWINGS

The invention is explained in greater detail below with reference to one exemplary embodiment that is illustrated in the accompanying figures, in which.

DESCRIPTION OF THE PREFERRED EMBODIMENT

In the example described here, the method claimed by the invention is used to determine the curvatures of a rail used as a track for a railway vehicle while the train is in motion. The curvature cannot be measured directly, but can be determined on one hand by using two Doppler radar sensors, for example, to record the left-side and right-side vehicle speed and calculating the curvature of the curve from the speed differential, or on the other hand by using a speed-of-rotation sensor (gyro) to measure the change in the angle of the truck around its axis of rotation that runs perpendicular to the plane of the track as well as a speed sensor to measure the speed of the vehicle, and by dividing the change in the angle by the speed to calculate the curvature of the curve.

The value of the curvature determined for the section of rail over which the car is traveling can be used to mechanically adjust the wheels of the railway vehicle to minimize the friction between the wheels and the rail. If the wheels are driven individually, their speed of rotation can also be set individually as a function of the curvature, so that no slip occurs between the rails and the wheels. As a result, the wear of the wheels and of the rails is significantly reduced, and the vibrations and other noises generated while the vehicle is negotiating curves do not increase with respect to the level generated when the vehicle is traveling on a straight track.

Figure 1:
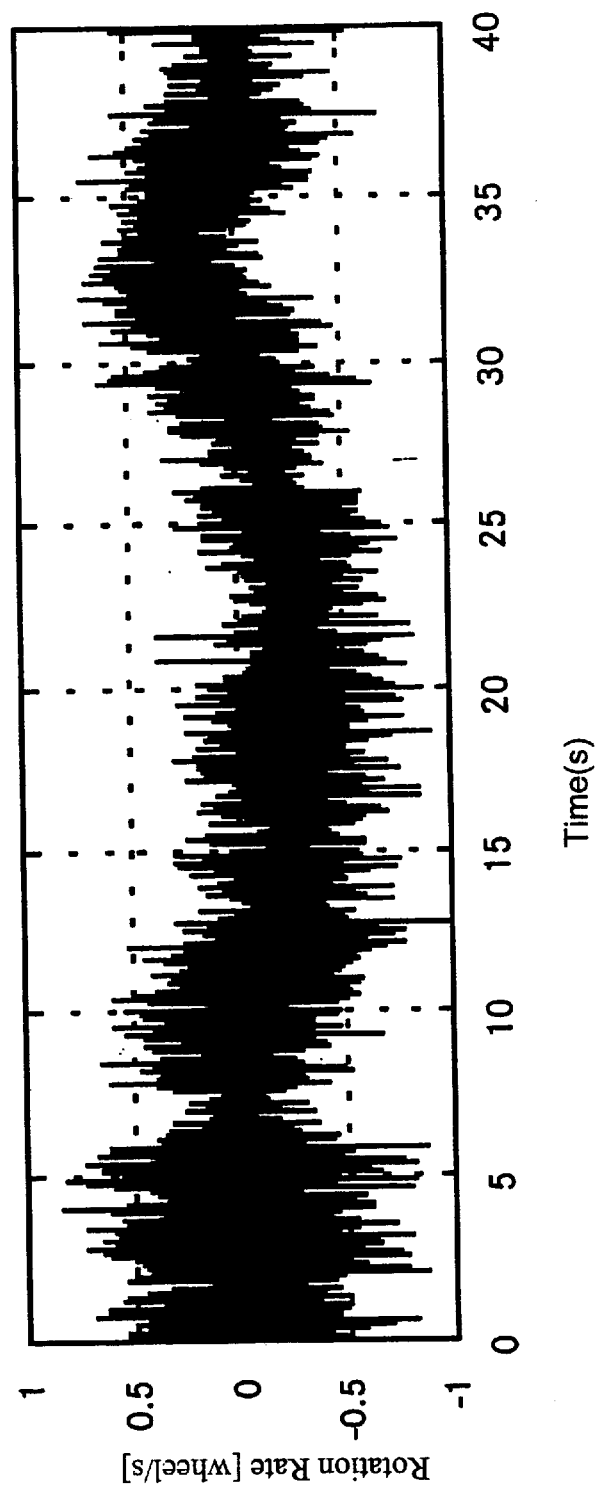
FIG. 1 shows a measurement signal received from a speed-of-rotation sensor for the movement of a railway vehicle.

As a result of the vibrations that occur during the travel of a railway vehicle, there is a great deal of noise in the output signals of the speed sensors and the speed-of-rotation sensors. FIG. 1 shows, by way of example, the output signal of a speed-of-rotation sensor. This diagram shows that in the measurement signal, the noise component is greater than the usable component, so that the determination of the useful signal or the value to be measured becomes significantly more difficult.

Figure 2:
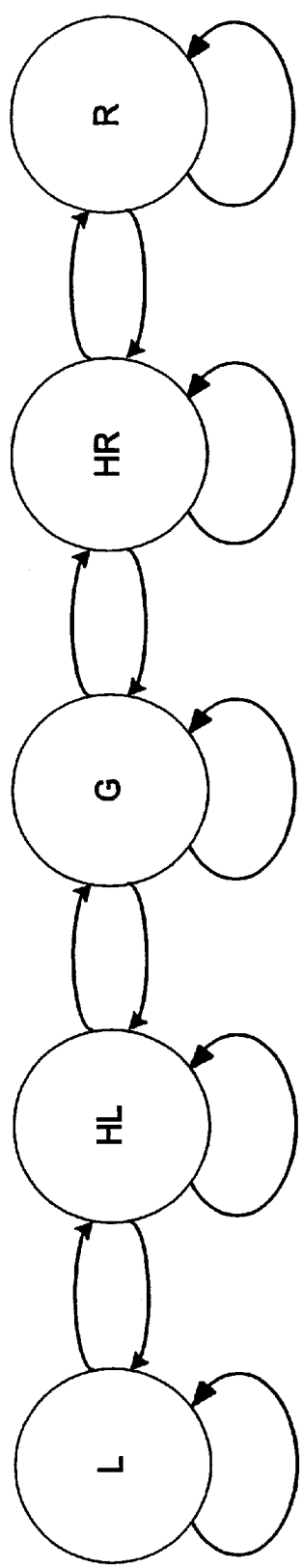
FIG. 2 shows a simple model with five states for the curvature of a rail used as a track for railway vehicles.

FIG. 2 shows an example of the model used for the method claimed by the invention. Here, too, the method is based on a plurality of states for the curvature of a rail that is used as a track for a railway vehicle. The states cover the entire possible range of curvature. For reasons of simplification, only five states are depicted in the illustrated example; depending on the desired accuracy of the result of the filtering, however, the number of states is generally significantly higher. The five states are designated "L" (left), "HL" (half-left), "G" (straight), "HR" (half-right) and "R" (right). For each sampling time, the model assigns a specified priority of occurrence to each state. For example, at a specified sampling time, the probabilities for the occurrence of state L are 12%, for state HL 40%, for state G 28%, for state HR 17% and for state R 3%.

Arrows between the individual states indicate the possibilities of a transition between any two states during the interval between two successive sampling times. For example, during such an interval, the state can remain state G or can change to HL or HR, while a transition from G to L or R is not possible during this interval. The model also contains an indication not shown in FIG. 2 concerning the probability of the transition from one specified state into another specified state. For example, at a specified sampling time, the probability that by the next sampling time the state G will not have changed is 50%, the probability that it will change to state HL is 20%, and the probability that it will change to state HR is 30%. If the number of states is significantly larger, there is also naturally the possibility that a state will change during an interval between samplings to a state that is two or three states away, or even more.

Figure 3:
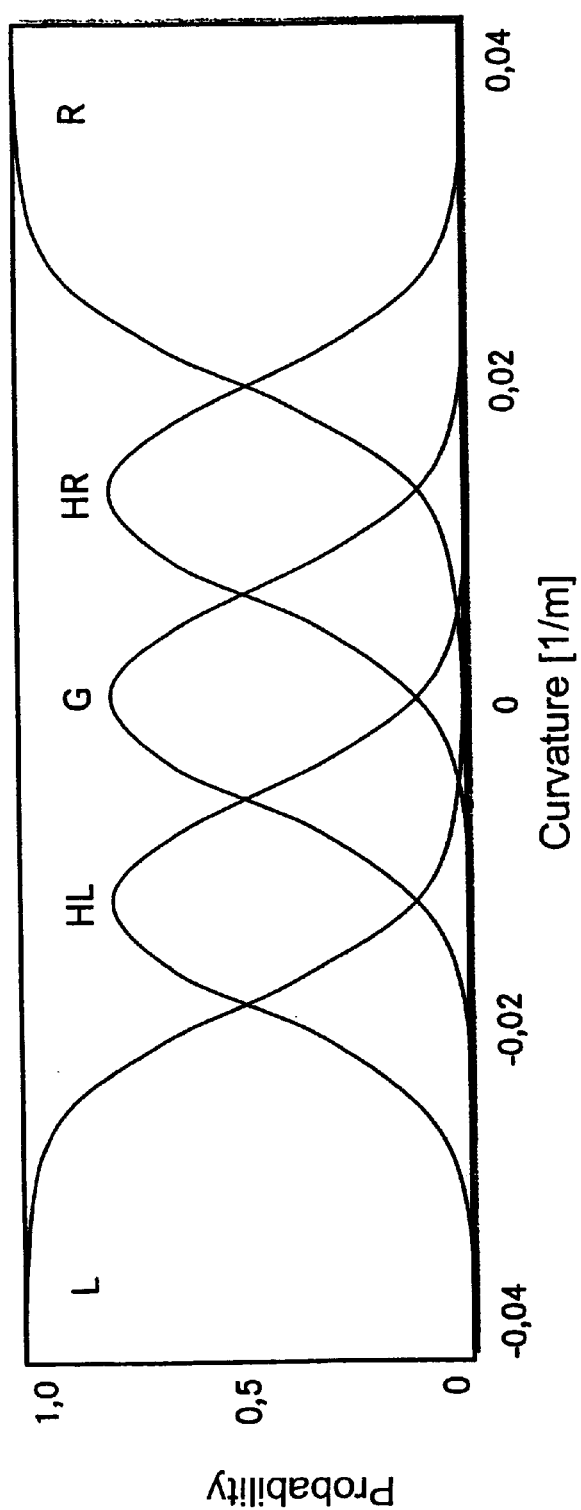
FIG. 3 shows a number of Gaussian functions for the probability of the occurrence of the states illustrated in FIG. 2 for a specified value of the measurement signal.

FIG. 3 shows the probability of the occurrence of the five above-mentioned states for the respective values of the measurement signal received at the sampling times. Associated with each state is a parameter function, by means of which the probability of the occurrence of the state can be calculated with the measurement value determined at each sampling time. The abscissa indicates the curvature determined from the measurement signal and comprises a range from −0.08 to +0.08/m. The dependence of the probabilities on the measurement signal or the curvature corresponds to a Gaussian function. At a curvature of 0/m, the probability that the state G (straight travel) exists is approximately 80%, and the probability that one of the states HL (half-left) or HR (half-right) exists is approximately 10% each. The probabilities for L or R are 0%. For example, if the measurement signal has a value of +0.02/m, the probabilities for L or HL are each 0%, the probability for G is approximately 20%, the probability for HR is approximately 75% and the probability for R is approximately 5%.

To determine the model values for a defined (and always the most recent) sampling time, the probabilities for the occurrence of each state at this time are determined by a combination of the probability values for all the states in the preceding sampling time, of the probability values for the continuation of a state and for the change from one state to another state between these two sampling times, and of the probabilities derived from the measurement signal of the most recent sampling time for the occurrence of the individual states. The weightings that are assigned to the respective values in the combination are a function of the process parameters, and are preferably determined empirically.

The value (useful signal) to be measured at the respective sampling time is calculated from the probabilities for the occurrence of the individual states of the model obtained for this sampling time. The value to be measured can be the state with the highest probability of occurrence. It is also possible, however, to determine the measured value from the sum weighted with the probabilities of the occurrence of some or all of the states, whereby the value measured then no longer corresponds to only one value associated with a specified state, but can assume any arbitrary value within the measurement range.

Figure 4:
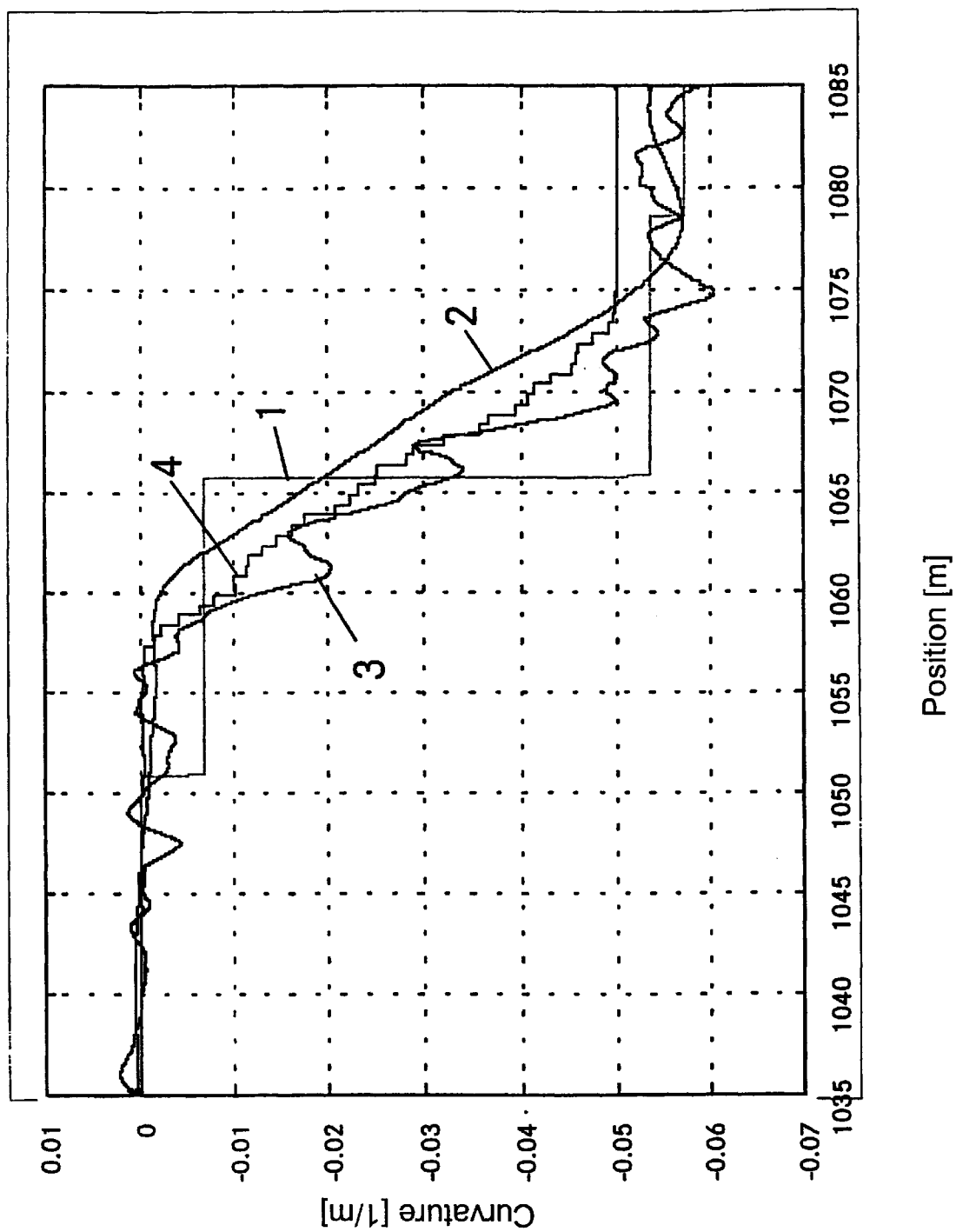
FIG. 4 shows the results obtained with the method claimed by the invention compared to the results obtained with a standard IIR filtering.

FIG. 4 shows measurement results from the method claimed by the invention compared to measurement results of a standard IIR filtering. The diagram indicates the curvature of the roadway of a railway vehicle in 1/m over a portion of the line plotted in m. The Curve 1 is a reference curve, whereby the goal is to approximate the respective measurements as closely as possible to the path of this curve (this is a theoretical curve, because in actual practice there are no sudden changes in the curvature).

Curve 2 was obtained by IIR filtering of the measurement signal with an upper limit frequency of 0.5 Hz and Curve 3 was obtained by IIR filtering of the measurement signal with an upper limit frequency of 1.0 Hz. Curve 4 was obtained using the method claimed by the invention. This curve has a lower limit value of −0.05 m, because no sharper curvatures were provided in the model used. A comparison of the curves shows that Curve 3 exhibits significantly greater fluctuations than Curve 4, and that Curve 2 is significantly delayed with respect to Curve 4.

Figure 5:
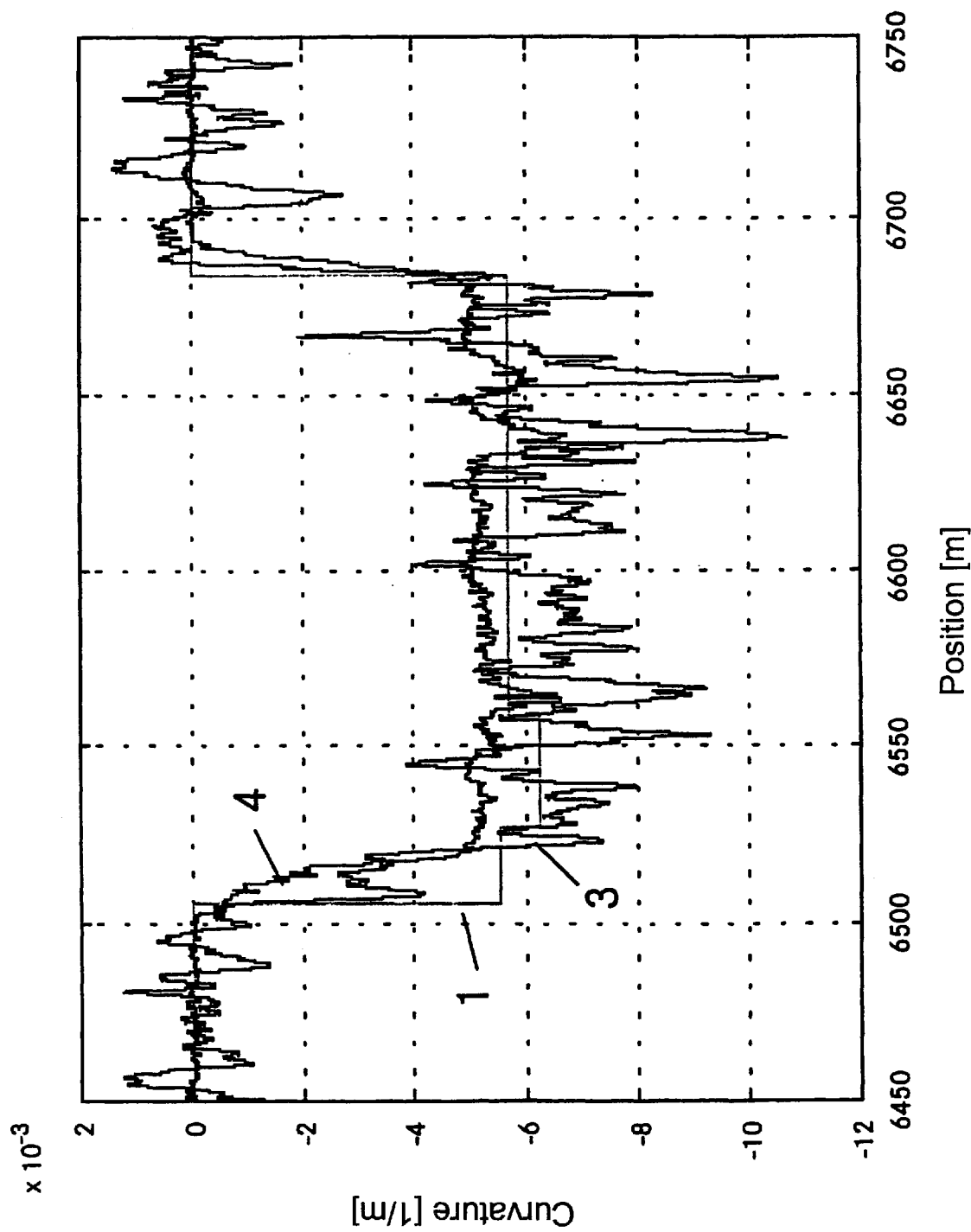
FIG. 5 shows the results obtained with the method claimed by the invention compared to the results obtained with an IIR filtering with approximately equal edge steepness.

FIG. 5 shows a diagram like the one presented in FIG. 4, but in FIG. 5, the curvature is presented on a larger scale and the track on a smaller scale, and Curve 2 has been deleted. Curves 3 and 4 have approximately the same edge steepness, i.e. the same delay with respect to Curve 1. The figure shows clearly that the suppression of the noise is significantly greater in Curve 4 than in Curve 3.

Figure 6:
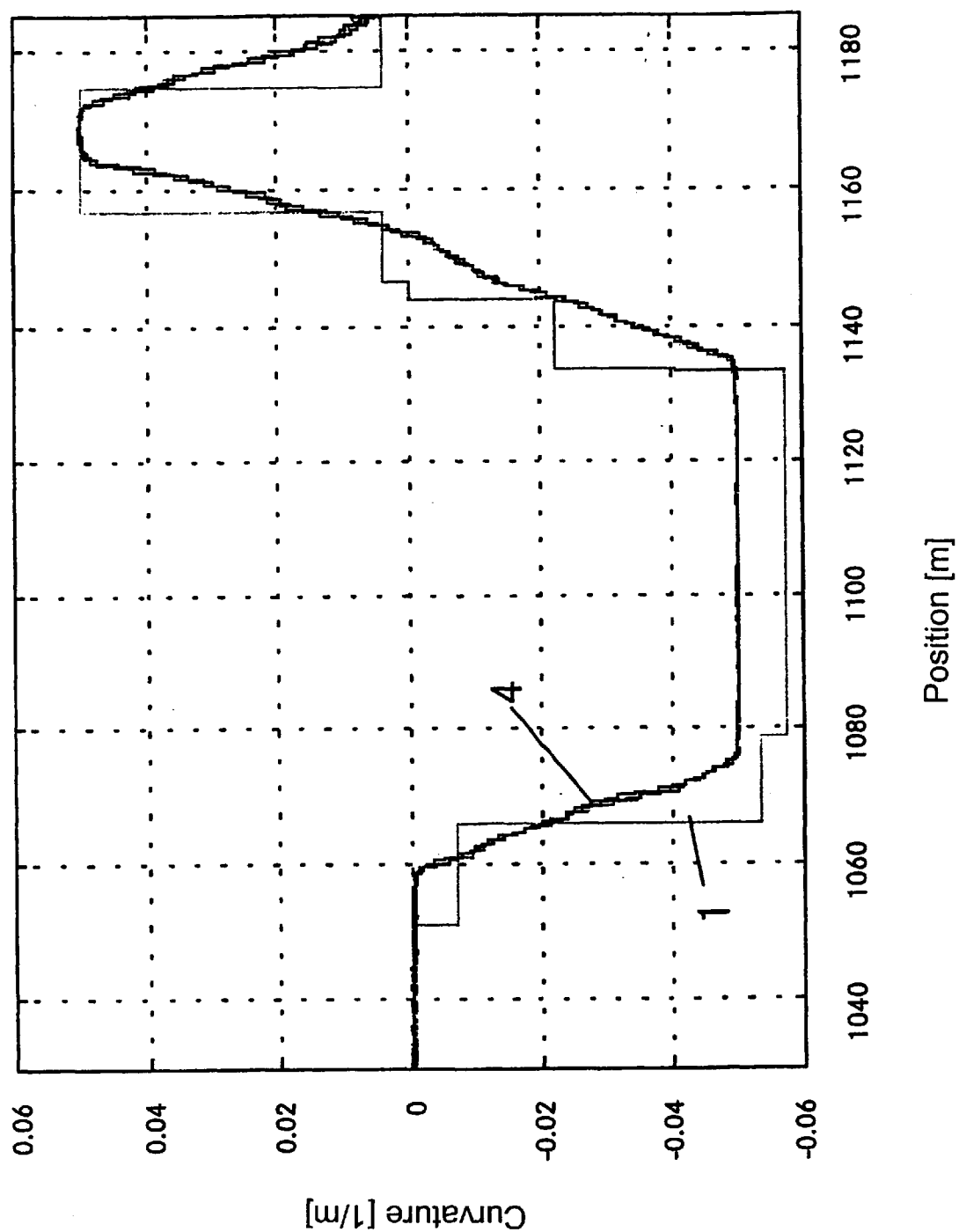
FIG. 6 is a diagram that illustrates the high repeatability of the results of the method claimed by the invention.

Finally, FIG. 6 presents an example that illustrates the repeatability of the results achieved by the method claimed by the invention. Curve 4' consists of three approximately overlapping Curves 4 that were obtained during three test runs of a railway vehicle. The figure shows clearly that this method makes possible a high repeatability of the variables to be measured.

The method claimed by the invention was explained with reference to an example in which the curvature of rails used as the track for railway vehicles is determined. It goes without saying, however, that the potential applications of this method are not limited to this example, but that the method can basically be used to filter any signals that are accompanied by noise or interference.

What is claimed is:

1. A method for the probabilistic estimation of noisy measurements on the basis of a measurement signal in which a noise signal is superimposed on the value to be measured, said method comprising the steps of:

associating a defined measurement range with the value to be measured; sampling the measurement signal at specified chronological intervals;

dividing the measurement range into discrete values; forming a model of a process on which the measurement signal is based with discrete states that correspond to the discrete values of the measurement range;

and whereby at each sampling time, assigning a probability value of the occurrence of each state to each state, determining the value to be measured on the basis of the probability value of at least one state, assigning a probability for the state to remain unchanged to each state, assigning a probability for the state in question to change to another state by the next sampling time, and recalculating based on the sample value of the measurement signal at the current sampling time the probability values for the occurrence of the states in the preceding sampling time, the probabilities for each state to remain unchanged and to change to another state between the two sampling times, and the probability values for the occurrence of the states of the model for the current sampling time are recalculated.

2. The method as claimed in claim 1, wherein the probability values associated with the sampled value of the measurement signal for the occurrence of the states at a sampling time are determined on the basis of a Gaussian function.

3. The method as claimed in claim 1, wherein the value to be measured is determined on the basis of the highest probability value for the occurrence of a state in the respective sampling time.

4. The method as claimed in claim 1, wherein the value to be measured is determined on the basis of the sum weighted with the probabilities for the occurrence of a plurality of states in the respective sampling time.

5. The method as claimed in claim 1, wherein the measurement signal is represented by an analog signal.

6. The method as claimed in claim 1, wherein the measurement signal is generated by a speed sensor of a railway vehicle.

7. The method as claimed in claim 6, wherein the measurement signal is generated by a speed-of-rotation sensor (gyro sensor) for the movement of a railway vehicle.

8. The method as claimed in claim 6, wherein the value measured is used to determine the curvature of rails used as track for railway vehicles.

9. The method as claimed in claim 2, wherein the value to be measured is determined on the basis of the highest probability value for the occurrence of a state in the respective sampling time.

10. The method as claimed in claim 2, wherein the value to be measured is determined on the basis of the sum weighted with the probabilities for the occurrence of a plurality of states in the respective sampling time.

11. The method as claimed in claim 2, wherein the measurement signal is represented by an analog signal.

12. The method as claimed in claim 3, wherein the measurement signal is represented by an analog signal.

13. The method as claimed in claim 4, wherein the measurement signal is represented by an analog signal.

14. The method as claimed in claim 2, wherein the measurement signal is generated by a speed sensor of a railway vehicle.

15. The method as claimed in claim 3, wherein the measurement signal is generated by a speed sensor of a railway vehicle.

16. The method as claimed in claim 4, wherein the measurement signal is generated by a speed sensor of a railway vehicle.

17. The method as claimed in claim 5, wherein the measurement signal is generated by a speed sensor of a railway vehicle.

18. The method as claimed in claim 14, wherein the measurement signal is generated by a speed-of-rotation sensor (gyro sensor) for the movement of a railway vehicle.

19. The method as claimed in claim 15, wherein the measurement signal is generated by a speed-of-rotation sensor (gyro sensor) for the movement of a railway vehicle.

20. The method as claimed in claim 7, wherein the value measured is used to determine the curvature of rails used as track for railway vehicles.

* * * * *